Nov. 2, 1965     W. O. TEETERS     3,215,457
PIPE COUPLING
Filed April 17, 1962     2 Sheets-Sheet 1
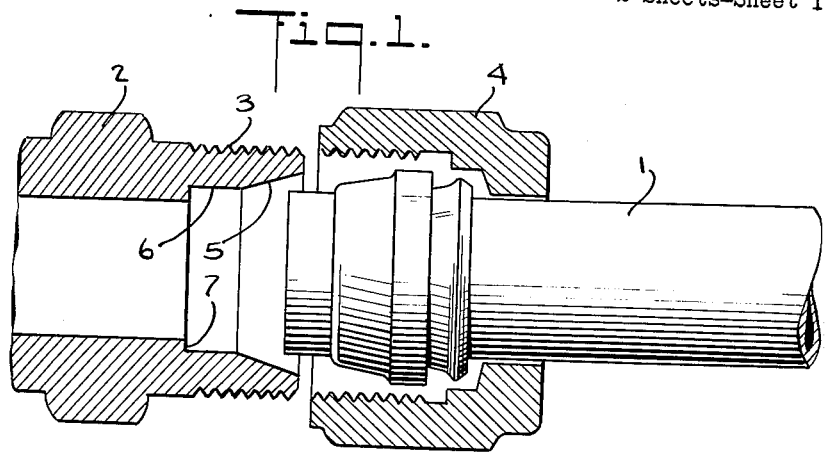
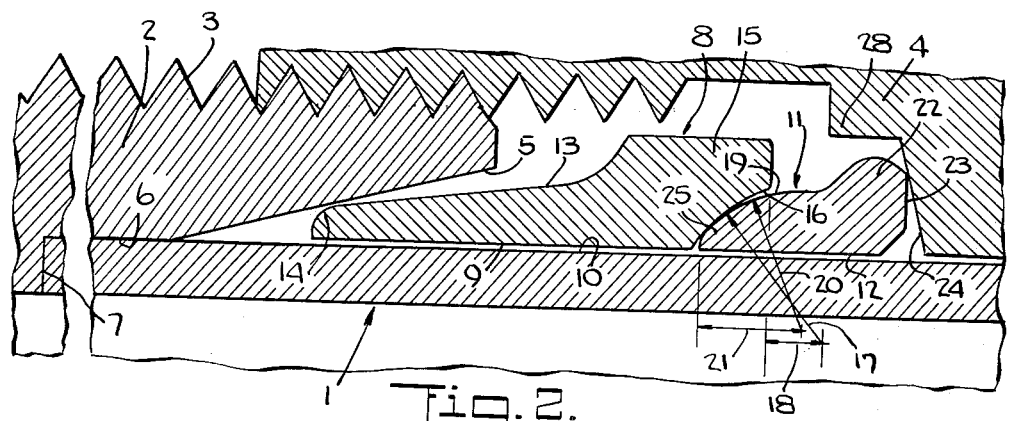
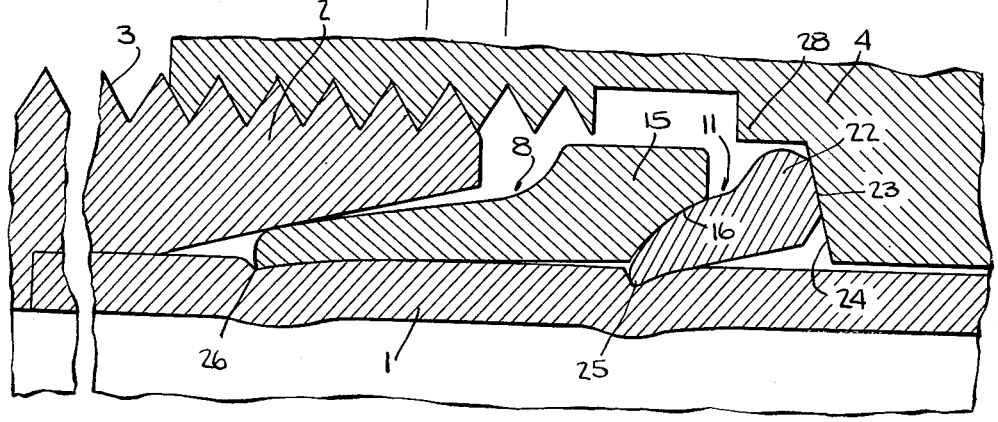
INVENTOR.
WILBUR O. TEETERS
BY
ATTORNEY

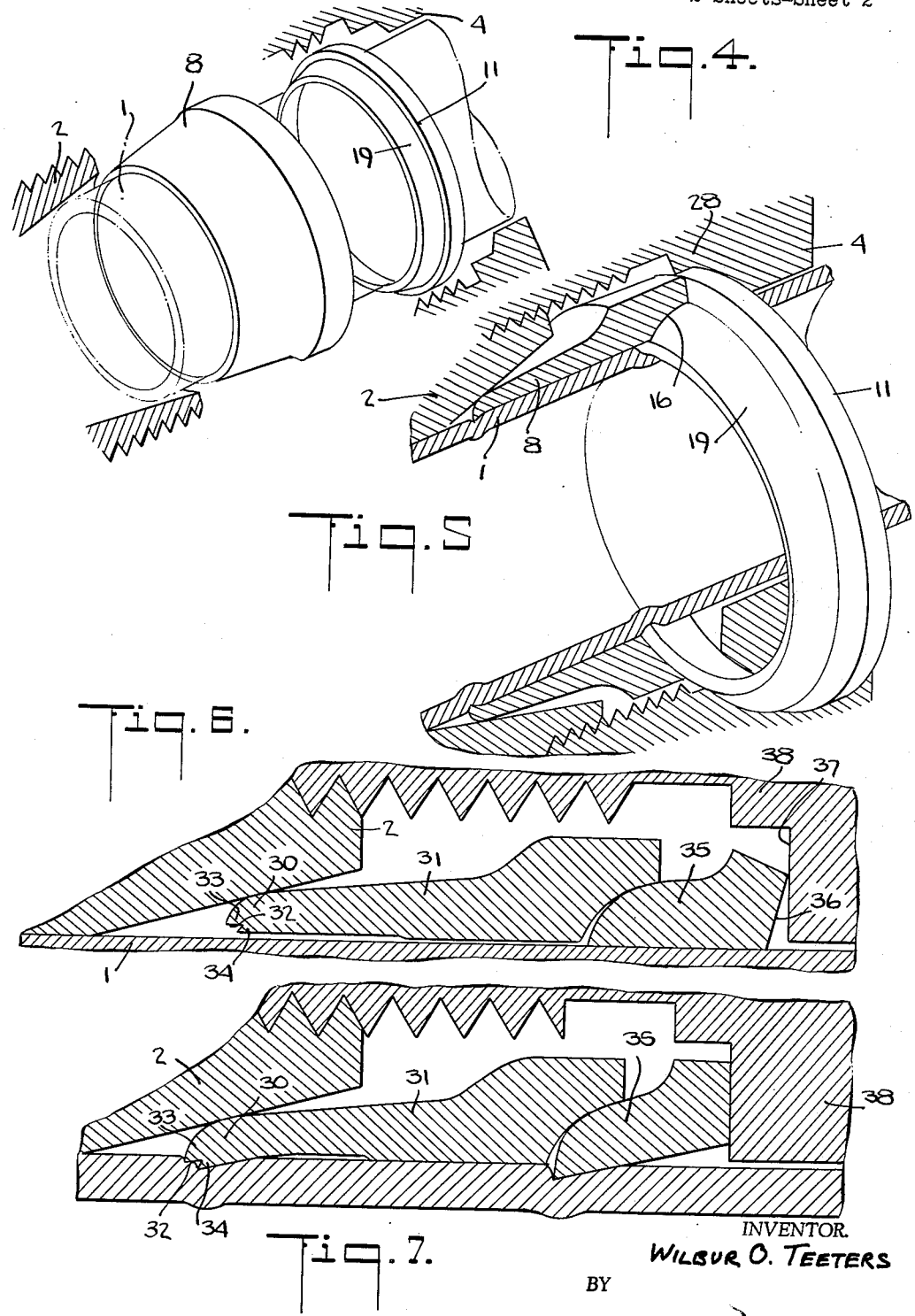

United States Patent Office 3,215,457
Patented Nov. 2, 1965

3,215,457
PIPE COUPLING
Wilbur O. Teeters, Norwood, N.J., assignor to Hoke Manufacturing Company, Inc., Cresskill, N.J., a corporation of New Jersey
Filed Apr. 17, 1962, Ser. No. 188,023
1 Claim. (Cl. 285—341)

The present invention relates to a compression pipe fitting or coupling and more particularly to an improved compression-type pipe coupling characterized by increased strength and reduced setting torque.

A wide variety of pipe couplings have been proposed or used for connecting unthreaded and flareless tubes or pipes by the use of compression fittings. This general type of coupling employs one or more ring-like ferrules or sleeves which encircle the tube and which connect the tube to a connecting member with the aid of a cooperating unit. These couplings provide a rapidly and easily applied connection since no threading or flaring is required on the tubular member and since the connection is made by merely slipping the fittings into place and turning a locking nut.

It has been found that the presently known connectors of this type have either one or both of two limiting characteristics, namely, either a connection is obtained which is not physically strong enough or an excess amount of torque is required in assembling and screwing the connector members together. The connector of this invention provides a compression type coupling having novel fitting members which overcome these objections and which provide a tight fluid seal having increased physical strength to resist rupture while at the same time being characterized by rapid assembly with a relatively low setting torque. As will be more fully described below, this improved result is obtained by a novel rolling action or gyration of one of the fitting members so that the fitting members are moved into locking and sealing relationship under setting forces which are appreciably lower than those now required for present compression couplings.

Accordingly, an object of the present invention is to provide an improved compression type pipe coupling.

Another object of the present invention is to provide an improved compression type pipe coupling characterized by a significantly reduced setting torque.

Another object of the present invention is to provide a compression type pipe coupling giving higher coupling strength.

Another object of the present invention is to provide a compression type pipe coupling having a unique rolling action in the fittings whereby the coupling is more easily applied.

Another object of the present invention is to provide an improved compression type pipe coupling having relatively simple fitting members.

Other and further objects of the invention will be obvious upon an understanding of the illustrative embodiment about to be described, or will be indicated in the appended claim, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a vertical sectional view illustrating a preferred embodiment of the coupling loosely assembled;

FIG. 2 is an enlarged detailed sectional view of the coupling fittings loosely assembled in a finger-tight relationship prior to the application of the setting torque;

FIG. 3 is an enlarged detailed sectional view similar to FIG. 2 illustrating the coupling in its final set position;

FIG. 4 is a perspective view partially cut away illustrating the coupling loosely assembled;

FIG. 5 is a perspective view of the coupling in its set position;

FIG. 6 is a vertical sectional view of another embodiment of the coupling in finger-tight relationship; and FIG. 7 is a vertical sectional view similar to FIG. 6 showing the coupling in its assembled pipe coupling position.

The coupling of this invention is adapted to couple a tube or pipe to a pipe connector, a valve or another element of a fluid system. For purposes of illustration, FIG. 1 illustrates a pipe 1 being connected to a threaded nipple 2. The nipple 2 is provided with a connecting portion including exterior threads 3 for engaging the internal threads of the nut 4 and a frusto-conical camming surface 5 which terminates in a counterbore 6 proportioned to receive the forward end of the pipe 1 which abuts shoulder 7. It is clear that the compression coupling of this invention may be used to connect the pipe 1 to any other element as long as the other element is provided with a connecting portion generally similar to that described above for the nipple 2.

As best illustrated in FIG. 2, the coupling comprises a front sleeve or ferrule 8 having a generally ring-like shape and an inner surface 9 having a sliding fit with the outer surface 10 of the pipe 1. A rear ferrule 11 cooperates with the front ferrule 8 in the setting of the compression coupling. The rear ferrule 11 also has a generally ring-like shape with its inner surface 12 adapted for a sliding fit on the outer surface 10 of the pipe 1. The physical connection of the pipe 1 to the nipple 2 as well as the fluid seal between the nipple 2 and the pipe 1 is accomplished by the engagement of the ferrules 8 and 11 with the pipe 1, with the frusto-conical portion 5 of the nipple, and with each other as the nut 4 is advanced on the threads 3 of the nipple. The preferred shape of the ferrules 8 and 11 and the inter-action of these ferrules with each other and with the pipe 1, the nipple 2 and the nut 4 will now be described with particular reference to FIGS. 2 and 3.

When the coupling is loosely assembled in finger-tight relationship as illustrated in FIG. 2, the end of the pipe 1 abuts the shoulder 7 within the counterbored portion 6 of the nipple 2. The frusto-conical portion 5 of the nipple 2 is provided to give a wedging action with the inclined forward surface 13 of the front ferrule 8 to form a fluid seal between the nipple and the pipe when the ferrule 8 is driven forward as the coupling is set. A preferred included angle between two opposite faces of the frusto-conical portion 5 is about 20 degrees and the preferred included angle between diametrically opposite surfaces 13 of the front ferrule 8 is a few degrees less, i.e. about 15 degrees. In order to facilitate the initial contact between the front ferrule 8 and the frusto-conical portion 5, the corner 14 of the front ferrule 8 is rounded.

The rear portion 15 of the front ferrule 8 is preferably a thickened and more rigid portion which has a generally rounded or sphero-concave guide portion 16 formed at its lower portion. This sphero-concave surface 16 in the preferred embodiment is formed with a radius proportioned and positioned generally corresponding to the radius illustrated at 17. For a ferrule 8 adapted for 5/8 inch tubing which has a length of about .36 inch a radius of about 1/3 the length or .12 inch has proven satisfactory with dimension 18 being about .024 inch.

The preferred embodiment of the rear ferrule 11 has a rounded forward surface 19 of generally sphero-convex shape. This surface corresponds generally to a spherical surface formed by a radius such as illustrated at 20 and which is slightly shorter than the radius 17 so that the surface 19 has a slightly sharper curvature than the rear surface 16 of the forward ferrule 8 which it abuts. For example, where the radius 17 is about .120 inch, radius 20 may be about .100 inch and dimension 21 about one half the length of ferrule 11 or .070 inch.

A thickened rear portion 22 on the ferrule 11 has a generally vertical camming surface 23 which is adapted to engage sloping camming surface 24 on the nut 4 during the setting of the coupling as will now be described.

Advancement of the nut 4 on the threads 3 from the finger-tight position of FIG. 2 results in the following locking or coupling setting movement of the ferrules 8 and 11. The rear ferrule 11 is first forced tightly against the curved surface 16 of the forward ferrule 8. This simultaneously advances the forward ferrule 8 to a tight wedging relationship between the frusto-conical surface 5 of the nipple connection and the outer surface 10 of pipe 1 and causes the rear ferrule 11 to roll or gyrate in a counterclockwise direction due to the combined rotational forces generated by the curved surfaces 16 and 19 and the angularly aligned rear surface 23 of ferrule 11 and the inclined surface 24 of the nut 4. This rolling action of the rear ferrule 11 forces its forward edge 25 to bite into the pipe 1 as illustrated in FIG. 3 so that an extremely strong physical and fluid tight connection is formed between the pipe 1, the ferrules 8 and 11 and the nut 4. It has been found that this rolling action of the rear ferrule 11 provides a deep penetration of the point 25 into pipe 1 with a relatively low torque being applied to the nut 4. A lesser penetration into the pipe 1 occurs at the forward edge 26 of the ferrule 8. With a coupling of the general proportion shown, the coupling is set with about one and one-quarter turns of nut 4 beyond the finger-tight position of FIG. 2.

An angle between the rear surface 23 of the ferrule 11 and the surface 24 of nut 4 of about 15 degrees has been found to give good results. A sufficient rolling or gyration of the rear ferrule 11 has been found to be obtained where the angle between surfaces 23 and 24 is reduced or eliminated as the abutting rounded surfaces 16 and 19 of the ferrules 8 and 11 provide also for the roll or gyration. In this case, however, a slightly higher setting torque is required. In order to limit the penetration of the rear ferrule 11 into the tube 1 particularly where the tube 1 is a relatively soft material, a shoulder 28 is provided on nut 4 as a retention surface to limit the gyrating action and thus the bit of ferrule 11.

My improved couplings when thus set have been found to have an extremely high static strength. This strength may be conveniently termed a static efficiency ratio which is expressed as a ratio of the static pull-out force in pounds required to destroy the coupling to the setting force in foot pounds required to rotate the setting nut 4 to its fully set position. Such efficiency ratio values have been measured for this coupling and they have been consistently found to be higher than 60 to 1 and normally as high as 100 to 1. Such ratios are as much as 30% greater than those found in testing other compression couplings.

Another important feature which has been observed in the above described coupling is its ability to be repeatedly reused so that fluid systems using these connectors may be dismantled and reassembled as often as desired without any reduction in the sealing ability and the coupling strength provided.

FIGS. 6 and 7 illustrate another embodiment of the coupling wherein a double grip or bite is provided at the forward edge 30 of a modified front ferrule 31. The forward edge 30 has a step 32 formed so that the wedging action which results from the advancement of the front ferrule 31 causes biting edges 33 and 34 to bite into the pipe 1 as illustrated in FIG. 7. The embodiment illustrated in FIG. 6 also illustrates a modified rear ferrule 35 in which an angular relationship is obtained between the rear surface 36 of the ferrule 35 and the camming surface 37 of the nut 38 by having the rear surface 36 of the ferrule 35 sloped at about a 15 degree angle from the vertical.

The coupling may be made of any of the various metals and plastic materials used for piping and related fittings such as brass, iron and steel including the stainless varieties. In general, the coupling material corresponds to the material used for the pipes being connected.

It will be seen that an improved compression type pipe coupling has been provided wherein an improved seal is obtained with a lower setting torque by the use of novel coupling elements so shaped that advantage is taken of a rolling action in the setting of the fittings against the pipe being coupled and against each other.

This improved action is obtained with relatively simple fittings adapted for easy application and capable of being manufactured by routine and high speed shaping operations. The coupling is also adapted for being dismantled and reused as many times as desired without any loss of its sealing efficiency.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

A tube coupling comprising a body having a cylindrical tube receiving bore with an outwardly flared end portion, a front ferrule having a cylindrical center bore for encircling and slidably engaging the tube, the front outer surface of said front ferrule flaring outwardly at a lesser flare than the flared end portion of said bore, the outer front corner of the front ferrule having a convex curvature adapted for engaging the tapered end portion of said body bore at a point between one-third and one-half the distance from the front end of said flared portion in initial non-pressure contact, the rear portion of said front ferrule having a radially outwardly extending abruptly thickened flange portion with a generally cylindrical outer surface, the center bore of the front ferrule terminating at its forward end in a relatively sharp corner and at its rear end in an outwardly flaring concave surface having an arcuate shape in a longitudinal radial plane, a rear ferrule having a cylindrical center bore for encircling and slidably engaging the tube, said rear ferrule having an axial dimension of about twice its maximum radial thickness in cross-section, the forward half of the outer surface of said rear ferrule having a convexly curved portion having an arcuate shape in a longitudinal radial plane and extending from the forward edge of the center bore at least half-way back the ferrule's length, the concave surface of the front ferrule engaging the convex portion of the rear ferrule, the arcuate shape of the convex portion of the rear ferrule being formed by a smaller radius than the radius forming the arcuate shape of the concave surface of the front ferrule, the rear half of said rear ferrule comprising a radially thickened portion about three-quarters of the maximum thickness of the flange portion of said front ferrule, a coupling nut threadedly engaging said body, said coupling nut having a general cylindrical inner shoulder portion spaced radially outwardly of said enlarged rear portion of said rear ferrule and permitting substantial outward movement of said rear portion, said coupling nut having a forwardly facing rear inner surface forming an inwardly flaring angle with the rear surface of the rear ferrule whereby the application of torque to said coupling nut applies a rolling force to the rear ferrule causing the forward end of the rear ferrule to roll inwardly against the tube and the rear portion to roll outwardly with the bore of the rear ferrule lifted from the tube and remaining relatively straight along a major portion of its length.

References Cited by the Examiner

UNITED STATES PATENTS

| | | | |
|---|---|---|---|
| 2,313,780 | 3/43 | Synder | 285—382.7 |
| 2,333,470 | 11/43 | Cowles | 285—382.7 |
| 2,397,749 | 4/46 | Mendelson | 285—332.1 |
| 3,069,188 | 12/62 | Crawford | 285—382.7 |
| 3,075,793 | 1/63 | Lennon | 285—382.7 |
| 3,103,373 | 9/63 | Lennon | 285—382.7 |
| 3,106,413 | 10/63 | Hamlin et al. | 285—212 |
| 3,146,006 | 8/64 | Schmohl | 285—342 X |

CARL W. TOMLIN, *Primary Examiner*.

THOMAS F. CALLAGHAN, *Examiner*.